(12) United States Patent
Woodward et al.

(10) Patent No.: US 9,031,419 B2
(45) Date of Patent: May 12, 2015

(54) OPTICAL NETWORKS USING MULTI-SPATIAL MODE MEDIA

(75) Inventors: Sheryl Woodward, Holmdel, NJ (US);
Martin Birk, Holmdel, NJ (US);
Michael Brodsky, Millburn, NJ (US);
Lynn E. Nelson, Matawan, NJ (US);
Xiang Zhou, Holmdel, NJ (US); Mark D. Feuer, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 654 days.

(21) Appl. No.: 13/247,230

(22) Filed: Sep. 28, 2011

(65) Prior Publication Data

US 2013/0077967 A1 Mar. 28, 2013

(51) Int. Cl.
*H04B 10/00* (2013.01)
*H04J 14/04* (2006.01)
*H04B 10/2581* (2013.01)
*H04B 10/50* (2013.01)
*H04J 14/02* (2006.01)

(52) U.S. Cl.
CPC ............... *H04J 14/04* (2013.01); *H04J 14/02* (2013.01); *H04J 14/0212* (2013.01); *H04B 10/2581* (2013.01); *H04B 10/5053* (2013.01)

(58) Field of Classification Search
CPC ............................. H04B 10/2581; H04J 14/04
USPC ................................................. 398/202, 204
See application file for complete search history.

(56) References Cited

U.S. PATENT DOCUMENTS

| | | | | |
|---|---|---|---|---|
| 5,991,062 | A * | 11/1999 | Fischer et al. | 398/204 |
| 7,233,442 | B1 | 6/2007 | Brown et al. | |
| 2010/0329671 | A1* | 12/2010 | Essiambre et al. | 398/44 |
| 2011/0188855 | A1* | 8/2011 | Kokubun et al. | 398/43 |
| 2011/0268456 | A1* | 11/2011 | Nakamoto | 398/152 |

OTHER PUBLICATIONS

"Fiber-Optic Communications: OFC Postdeadline Highlights include 100 Tbit Fiber Transmission", downloaded from http://www.laserfocusworld.com/articles/2011/05/fiber-optic-communications-ofc-postdeadline-highlights-include-100-tbit-fiber-transmission.html on Dec. 28, 2011 (3 pages).

"Transmission Impairments", downloaded from http://www.ligaturesoft.com/data_communications/trans-impairment.html on Dec. 28, 2011 (1 page).

(Continued)

*Primary Examiner* — Danny Leung
(74) *Attorney, Agent, or Firm* — Hoffmann & Baron, LLP

(57) ABSTRACT

A fiber optic system includes a transmitter for transmitting high-speed streaming electrical data to a receiver for receiving the high-speed data. In order to transmit multiple channels in the system at high-speeds, an electrical data signal is converted into multiple optical sub-signals. Each of the multiple optical sub-signals are transmitted at the common wavelength on multi-spatial mode media. The receiver receives the multiple optical sub-signals as a multi-spatial mode optical signal and separates the multi-spatial mode optical signal into branch signals having a common wavelength. The receiver mixes each of the branch signals with optical carrier waves having the common wavelength and converts the branch signals into electrical signals. Digital signal processing is used to recover the data sub-signals which are used to recover the original data signal.

10 Claims, 10 Drawing Sheets

(56) References Cited

OTHER PUBLICATIONS

"Seven-Core Multicore Fiber Transmissions for Passive Optical Network", downloaded from http://www.opticsinfobase.org/spotlight/summary.cfm?uri=oe-18-11-11117 on Dec. 28, 2011 (2 pages).

Wikipedia, "Fiber-Optic Communication", downloaded from http://en.wikipedia.org/wiki/Fiber-optic_communication on Dec. 28, 2011 (12 pages).

Wikipedia, "Multiplexing", downloaded from http://en.wikipedia.org/wiki/Multiplexing on Dec. 28, 2011 (8 pages).

* cited by examiner

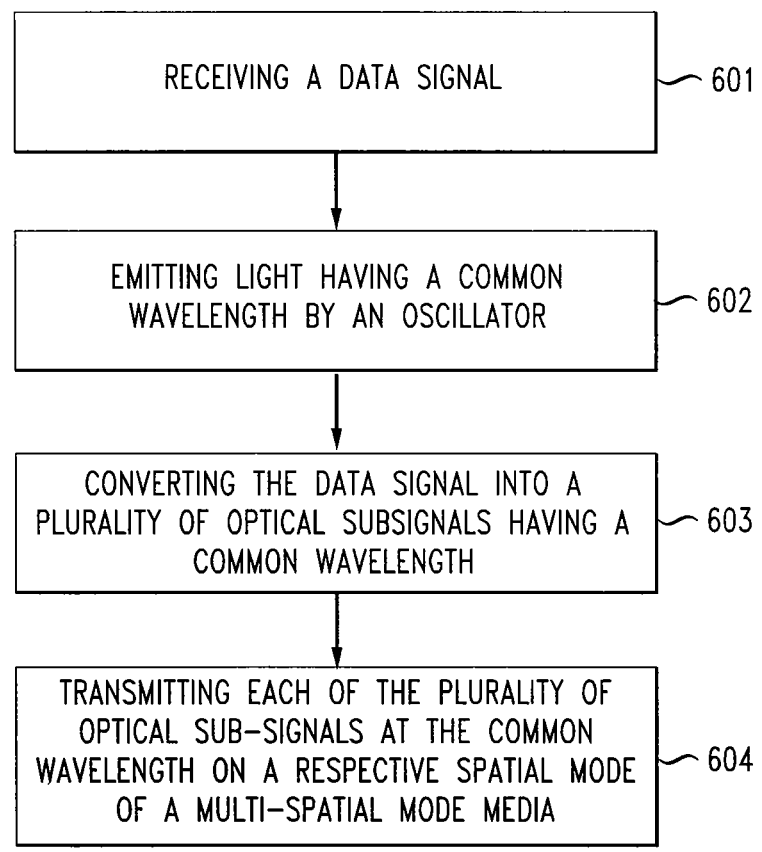

OPTICAL NETWORKS USING MULTI-SPATIAL MODE MEDIA

FIELD

The present application relates to transmission and reception of signals over multiple spatial modes, and in particular relates to transmission and reception of signals having a common wavelength over multi-spatial mode media.

BACKGROUND

In fiber-optic communication system development, there is a need to increase the capacity of a fiber transport connection. In the first optical communications systems virtually all transport was implemented by On-Off Keying (OOK) of a single wavelength, and throughput was upgraded by increasing the symbol rate. This was followed by the introduction of parallelization into the fiber link by carrying many different data streams on separate wavelengths in the same optical fiber using wavelength-division multiplexing (WDM). Currently, wavelength counts in practical deployments have coalesced around 80-96 wavelengths per fiber at 50 GHz spacing, and have stopped increasing rapidly.

Other sophisticated modulation formats include Polarization-Multiplexed Quadrature Phase-shift Keying (PM-QPSK) and Orthogonal Frequency-Division Multiplexing (OFDM) that are used to simultaneously achieve data rates higher than the symbol rates and improved spectral efficiency.

FIG. 1 illustrates a conventional optical fiber 100. Optical fiber 100 is made up of concentric cylinders of glass and/or other materials. At the center of the optical fiber 100 is the core 102 which is a region of high refractive index where the electromagnetic field of the light is concentrated. Surrounding the core is the cladding 103, typically a region of lower refractive index than the core. The diameters and refractive indices of the core 102 and the cladding 103 are chosen so that the light is trapped by the core 102 and will not leak out of the fiber 100 as it propagates lengthwise along the fiber 100. The outermost layer, the coating 104, is applied to provide mechanical and chemical protection of the cladding from scratches and micro-bends, water penetration, etc. A typical single-mode fiber may have a 9 micron diameter core made of Germanium (Ge)-doped silica glass, a 125 micron diameter cladding made of undoped silica glass, and a 250 micron diameter coating of sophisticated polymer compounds. Because of the small core diameter, only a single transverse mode of the light is possible at standard wavelengths of 1310 nm to 1600 nm, for example, those typically used in telecommunications systems. The single-mode fiber can transmit two orthogonal polarizations, and each distinct wavelength may be considered as a separate longitudinal mode. The core 102, cladding 103, and coating 104 layer may be contained in an outer jacket 105, which provides additional mechanical strength and protection to the fiber 100.

BRIEF SUMMARY

The present disclosure provides a method and system for space division multiplexing (SDM) transmission and reception using multi-spatial mode fiber or media. According to various embodiments, the multi-spatial mode media may be a multicore fiber with multiple core regions, a multimode media, which has a single, larger core proportioned to support the propagation of multiple transverse optical modes, or other types of fibers that support transmission of multiple spatial modes. For example, multiple multimode cores in a single fiber may also be used in the SDM transmission method of the present disclosure; or the modes associated with multiple smaller cores may interact enough to permit the aggregate structure to act like a single larger core; or a fiber may support multiple optical angular momentum modes. Additionally, the SDM transmission of the present disclosure may also use a fiber ribbon made up of multiple single-mode fibers.

In one embodiment, a method and system for transmitting data in an optical network includes a transmitter for sending a data signal. The signal may be streaming data, for example. The data signal may be converted into multiple optical sub-signals having a common wavelength. Each of the optical sub-signals may be transmitted at the common wavelength on a respective spatial mode, or on a respective group of spatial modes, of multi-spatial mode media.

In another embodiment, a method and system for receiving data in an optical network includes a receiver for receiving a multi-spatial mode optical signal over a multi-spatial mode media. The multi-spatial mode optical signal may be separated into multiple branch signals corresponding to signals of a common wavelength received on different spatial modes of the multi-spatial mode media. Each of the multiple branch signals may be mixed with optical carrier waves having the common wavelength. Each of the multiple branch signals mixed with the optical carrier waves is converted into respective multiple data sub-signals. The conversion from branch signals to data sub-signals may employ digital signal processing that uses information derived from multiple branch signals. The multiple data sub-signals are combined to recover a data signal.

In yet another embodiment, an optical network system may be provided. The system may include a light source configured to generate optical carrier waves having a common wavelength. The system may also include a converter configured to convert a data signal into multiple sub-signals. The system may include multiple modulators configured to generate multiple optical sub-signals by modulating the plurality of sub-signals onto the optical carrier waves. The system may further include a multiplexer configured to transmit each of the multiple optical sub-signals onto respective spatial modes of multi-spatial mode media at the common wavelength.

In another embodiment, a system and method for transmitting a data signal through an optical network is provided. The data signal is formatted into multiple optical sub-signals sharing a common wavelength. Each of the optical sub-signals are transmitted at the common wavelength on a respective spatial mode of the media. The optical sub-signals are routed together, at the common wavelength at an intermediate node. As such, all of the optical sub-signals follow the same path through the network. By formatting the data signal in this way, the efficiency of wavelength routing and of wavelength reuse can be optimized.

These and other advantages of the disclosure will be apparent to those of ordinary skill in the art by reference to the following detailed description and the accompanying drawings.

BRIEF DESCRIPTION OF THE DRAWINGS

FIG. 6 is a flowchart of a method for transmitting data in a fiber optic system in accordance with an embodiment of the present disclosure;

DETAILED DESCRIPTION

Figure 1:
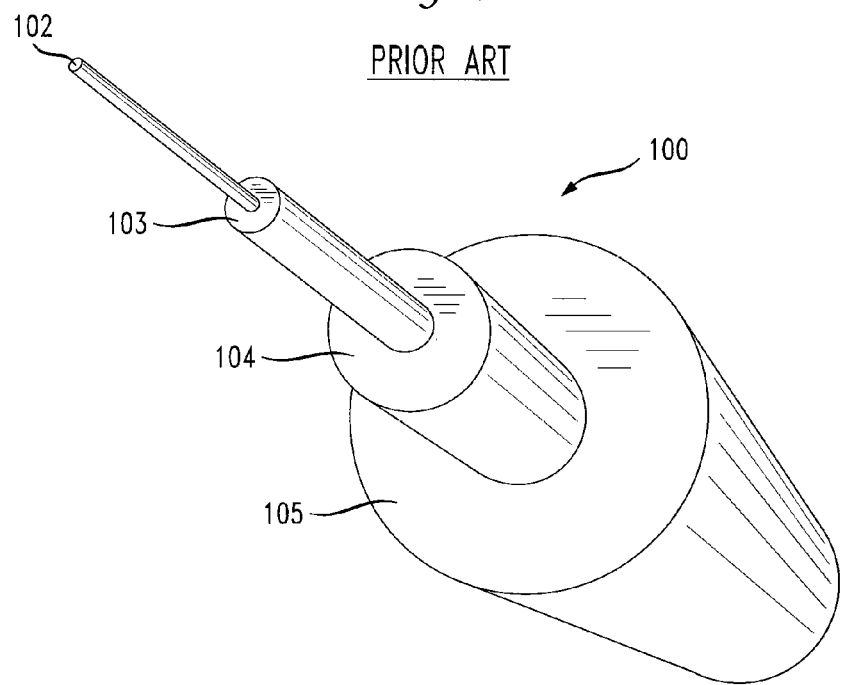
FIG. 1 illustratively depicts a conventional single-mode fiber.
Figure 2:
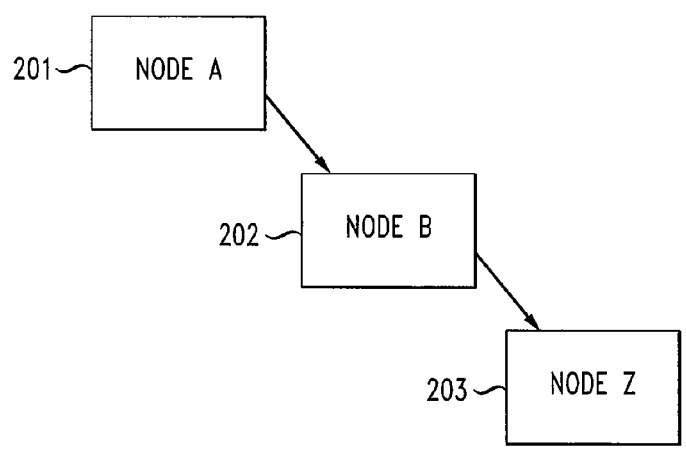
FIG. 2 illustratively depicts communication between nodes.

FIG. 2 illustrates communication between 3 nodes. Data, such as a high-speed, large bandwidth streaming data signal, is transmitted from Node A 201 to Node Z 203 traveling through Node B 202. In one example, Node A 201 may be located in New York City, Node B 202 may be located in Newark, N.J. and Node Z 203 may be located in Philadelphia, Pa. Various optical data communication methods will be described herein in the following figures using Nodes A, B and Z as exemplary nodes.

Figure 3A:
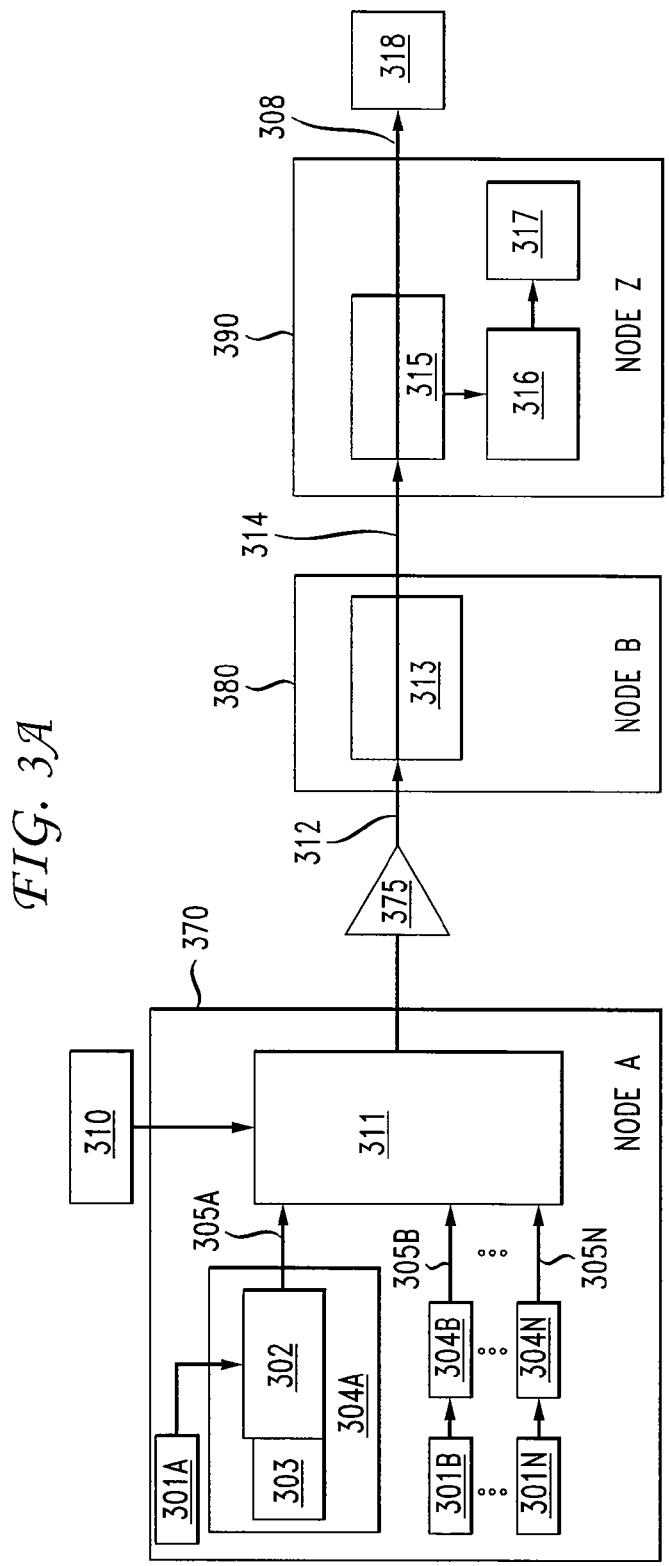
FIG. 3A illustratively depicts a typical communication between nodes in an optical fiber network system.

FIG. 3A depicts optical network communication between Nodes A, B and Z (370, 380 and 390, respectively) using single-mode fiber. Each of data signals 301A, 301B . . . 301N may be transmitted to Node A 370. For example, data signals 301A, 301B . . . 301N may be electrical signals representing streaming data. Data signal 301A may be input into a channel transmitter 304A. Node A 370 may include a plurality of channel transmitters 304A, 304B . . . 304N, each of which receive respective input data signals 301A, 301B . . . 301N. Each channel transmitter may include a light source and a modulator. Furthermore, each data channel transmitter may handle a data rate of 40 Gigabits per second (Gbps) and/or a signal bandwidth of 40 Gigahertz (GHz) or larger. The speed may vary depending on the modulation format.

Data signal 301A is transmitted to a modulator 302 of channel transmitter 304A. The modulator 302 may be coupled to a light source 303. The light source 303 may be a laser, such as a semiconductor laser. The modulator 302 modulates data signal 301A onto an optical carrier wave emitted from the light source 303.

Modulator 302, in channel transmitter 304A, generates a modulated optical signal carried on a single-mode fiber 305A. The modulated optical signal is transmitted on a wavelength λA; channel transmitter 304B generates a modulated optical signal carried on a single-mode fiber 305B and the modulated optical signal is transmitted on another wavelength λB; and channel transmitter 304N generates a modulated optical signal carried on a single-mode fiber 305N transmitted on another wavelength λN and so forth. Alternatively, it is possible to use integrated optics in place of the modulators and multiplexer 311 on the same chip. In this example, optical waveguides would be used on the chip and 305A, 305B . . . 305N may include waveguides on an integrated device containing both modulators and multiplexers or a single mode optical fiber coupled to both the modulator in channel transmitter 304A and multiplexer 311.

The modulated optical signals, carried on respective single-mode fibers 305A, 305B . . . 305N, are combined by a multiplexer 311 to generate a combined optical signal carried on a single-mode fiber 312. The multiplexer 311 may also combine the modulated optical signal with an optical signal 310 received from another node. If so, the wavelengths used at Node A must be different from those included in the incoming optical signal 310. The multiplexer 311 may be a reconfigurable optical add-drop multiplexer (ROADM) and may include a wavelength multiplexer. The multiplexer 311 combines the modulated optical signals carried on respective single-mode fibers 305A, 305B . . . 305N from the channel transmitters into one combined optical signal that is transmitted out of Node A 370 carried on a single-mode fiber 312. Each of the modulated signals carried on respective single-mode fibers 305A, 305B . . . 305N generated by the respective channel transmitters 304A, 304B . . . 304N is a respective channel of the combined optical signal. Accordingly, different channels of the composite optical signal transmitted on the single-mode fiber 312 correspond to different wavelengths.

The combined optical signal carried on the single-mode fiber 312 will be attenuated as it is transmitted along single-mode fiber 312 (e.g., typical attenuation is 0.2 decibels/kilometer (dB/km)). If the distance between Node A 370 and Node B 380 is sufficiently large, than one or more optical amplifiers 375 may be used to amplify the combined optical signal. Erbium-doped-fiber amplifiers (EDFAs) are typically used, but Raman amplifiers and semiconductor optical amplifiers or other types of amplifiers can also be used to amplify the combined optical signal.

The combined optical signal carried on the single-mode fiber 312 may then be transmitted to an intermediary node, such as Node B 380. The node may include a multiplexer 313 (such as a ROADM). Multiplexer 313 can add and/or drop individual wavelength channels at Node B 380. Multiplexer 313 may express a wavelength channel λJ through Node B without optical to electrical to optical conversion; it may drop wavelength channels (e.g. wavelength channel λK) at Node B. Multiplexer 313 may also add additional signals to the combined optical signal. The additional signals may include signals at wavelengths that are no longer part of the combined signal, such as dropped wavelength channels (e.g. λK) or wavelengths that were not included in the combined signal carried by optical fiber 312). Multiplexer 313 may forward the combined optical signal to a destination node, Node Z 390, carried on another single-mode fiber 314.

At Node Z 390, the combined optical signal, carried on the single-mode fiber 312, is received at multiplexer 315, which may include a wavelength demultiplexer. If Node Z 390 is the destination node for one or more data channels, the wavelength(s) corresponding to those channel(s) are separated from the combined optical signal and routed to receiver 316. The receiver 316 then converts each optical signal back into a data signal 317. If desired, new data channels may be added to the combined signal exiting Node B or Node C by modulating them onto wavelengths which are not otherwise in use in the output signals from these nodes. If a data channel on wavelength λJ is separated from the combined signal and later replaced by a different data channel on wavelength λJ, this process is referred to as "wavelength reuse". Wavelength reuse may be a feature used for efficient operation of complex optical networks.

The combined optical signal may be further transmitted to other nodes 318 carried on a single-mode fiber 308 and may be received by other nodes 318 in a similar manner as the receiver 316 of Node Z 390. Although the FIGS. 3A and 3B describes a linear chain of three nodes, actual optical networks may include many nodes and many fiber links, arranged in ring or mesh topologies.

In this example, each strand of single-mode fiber used to transmit the combined optical signal may carry 80 to 100 data channels, each data channel carrying a 40 Gbps data stream.

Figure 3B:
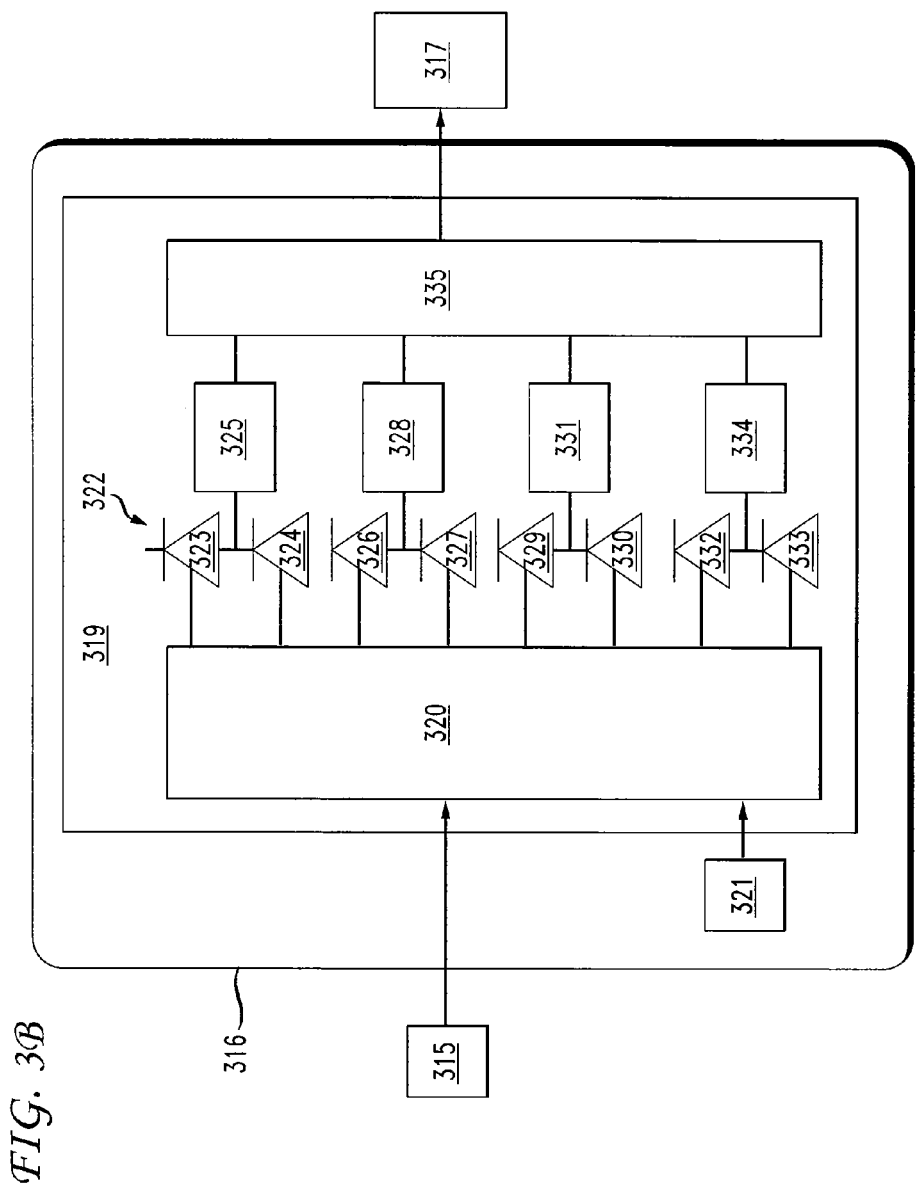
FIG. 3B illustratively depicts details of a receiver shown in FIG. 3A.

FIG. 3B depicts details of receiver 316 of FIG. 3A. The receiver 316 may be a coherent receiver, for example, to be used in the Polarization-Multiplexed Quadrature Phase-shift Keying (PM-QPSK) systems for one channel. The receiver 316 includes a receiver front end 319. The receiver 316 receives the optical signal transmitted from multiplexer/demultiplexer 315. Specifically, the optical signal is transmitted from multiplexer/demultiplexer 315 to a polarization-diverse 90-degree hybrid 320. The polarization-diverse 90-degree hybrid 320 mixes X and Y polarization components of the optical signal transmitted from multiplexer/demultiplexer 315 with an optical carrier wave emitted from local oscillator 321 at a certain wavelength with certain relative phase differences. The local oscillator 321 may be a laser, such as a semiconductor laser. The coherent receiver 316 is designed to receive only a single wavelength channel at a time. Therefore, a plurality of receivers is needed for a respective, plurality of channels.

The polarization-diverse 90-degree hybrid generates four pairs of output optical signals: two pairs for X polarization, resulting from mixing the signal's electric field with that of a local oscillator (LO) with 0 and $\pi$, and $\pi/2$ and $3\pi/2$ relative phase differences, and two pairs for Y polarization resulting from mixing the signal's electric field with that of the LO with 0 and $\pi$, and $\pi/2$ and $3\pi/2$ relative phase differences. These four pairs of output optical signals are coupled to respective pairs of balanced, matched photo-detectors, depicted in a series 322, whose electrical outputs are subtracted to improve the signal-to-noise ratio of the resulting electrical signals, which are then sent to a respective analog-to-digital converter (ADC). For example, the outputs of photo detectors 323 and 324 are subtracted and the resulting electrical signal is coupled to analog to digital converter 325; the outputs of photo detectors 326 and 327 are subtracted and the resulting electrical signal is coupled to ADC 328; the outputs of photo detectors 329 and 330 are subtracted and the resulting electrical signal is coupled to ADC 331, and the outputs of photo detectors 332 and 333 are subtracted and the resulting electrical signal is coupled to ADC 334.

Figure 4A:
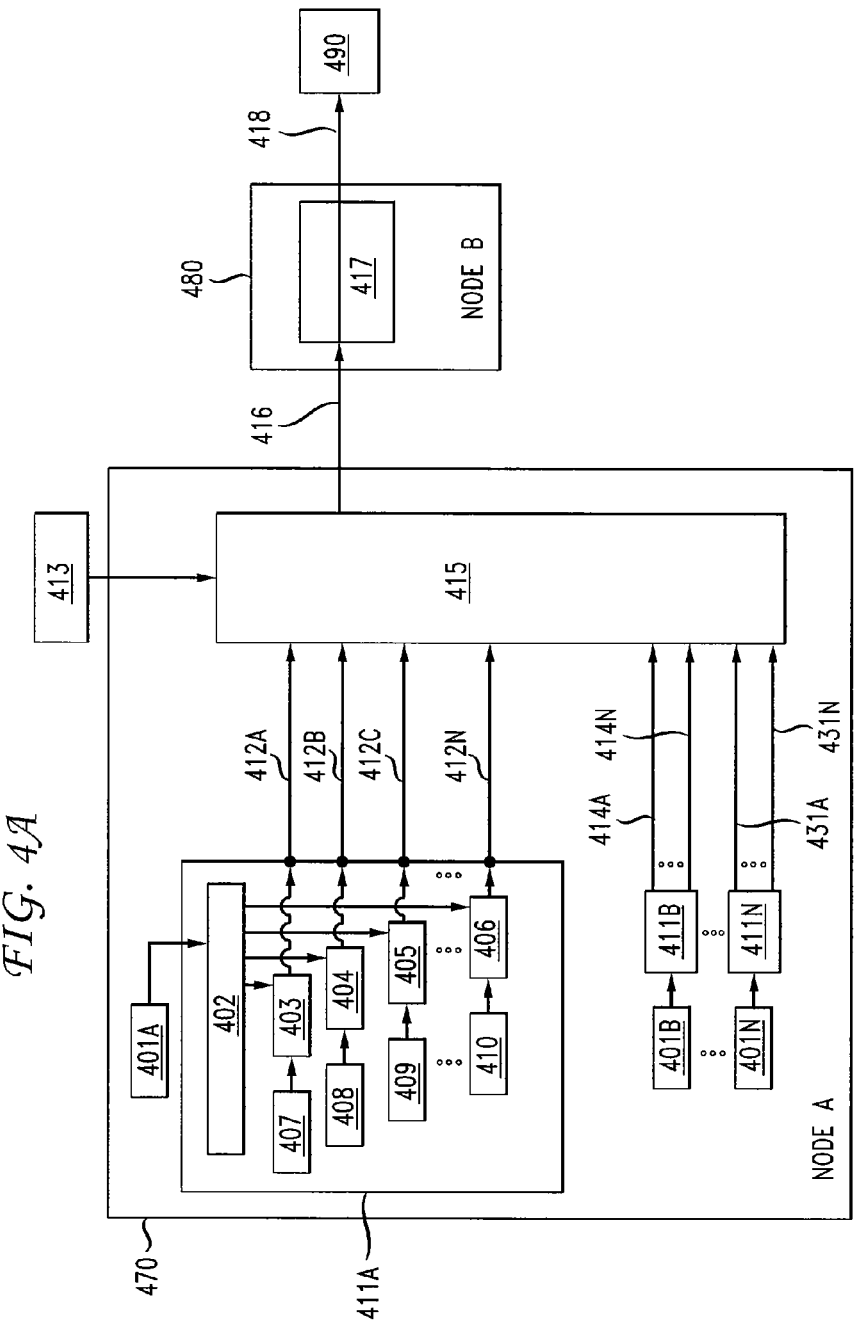
FIG. 4A illustratively depicts a transmitter within a node and an intermediate node using single-mode fiber for transmission in an optical fiber network system.
Figure 4B:
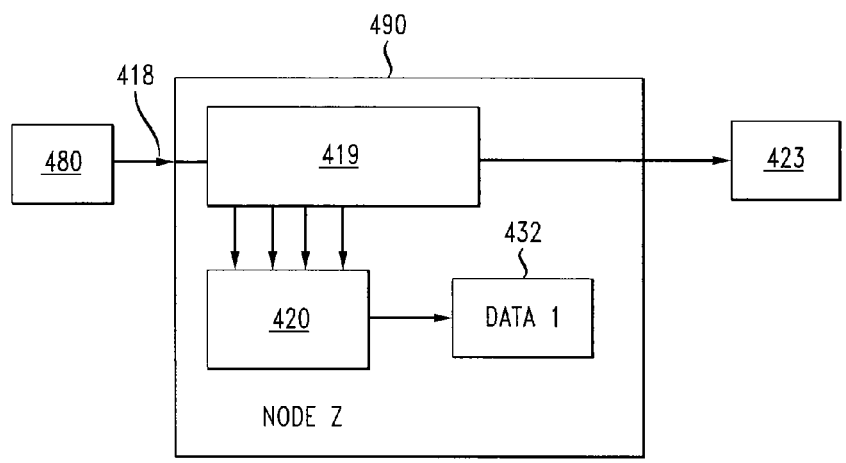
FIG. 4B illustratively depicts a receiver within a node in the optical fiber network system.

ADC 325 produces an in-phase component for X polarization transmitted to digital signal processor 335. ADC 328 also produces a quadrature component for X polarization transmitted to the digital signal processor 335. ADC 331 also produces an in-phase component for Y polarization transmitted to the digital signal processor 335. ADC 334 additionally produces a quadrature component for Y polarization transmitted to the digital signal processor 335. The component signals input to the digital signal processor 335 have been mixed together and distorted during their passage through the transmission channel. The digital signal processor 335 deconvolves them and performs various filtering and processing techniques in order to recover a signal 318 that is similar to the originally transmitted data signal 301A FIGS. 4A and 4B illustratively depict an optical network that may be capable of handling higher speed data channels, such as one greater than 100 Gbps. Transmitting very high bandwidth optical signals, such as a 1 Terabit (Tb) Ethernet, may require multiple wavelengths and multiple optical modulators to transmit each data channel in the network. Optical network communication between Nodes A, B and Z (470, 480 and 490, respectively) use single-mode fiber.

FIG. 4A depicts optical network communication between Nodes A, B and Z (470, 480 and 490, respectively) using single-mode fiber. Data signal 401A, 401B . . . 401N may be electrical signals representing streaming data. Data signal 401A may be input into a channel transmitter 411A. A single node, such as Node A 470, may include a plurality of channel transmitters 411A, 411B . . . 411N. Each channel transmitter may include a serial to parallel converter, a plurality of light sources at different wavelengths and modulators.

Data signal 401A is transmitted to a serial to parallel converter 402 in Node A 470. The serial to parallel converter 402 separates the data signal 401A into multiple data sub-signals. Each data sub-signal is transmitted to a respective modulator 403, 404, 405 . . . 406. Each modulator 403, 404, 405 . . . 406 may be coupled to a respective light source 407, 408, 409 . . . 410. Each light source 407, 408, 409 . . . 410 may be a laser, such as a semiconductor laser or diode, or it may be a single wavelength output from a multi-wavelength laser. The different light sources 407, 408, 409 . . . 410 emit optical carrier waves having different wavelengths. Each modulator 403, 404, 405 . . . 406 modulates its respective data sub-signal onto an optical carrier wave emitted by the respective light sources 407, 408, 409 . . . 410. Node A 470 may include multiple data channel transmitters 411A, 411B . . . 411N each containing multiple modulators and light sources. Data signals 401B . . . 401N are transmitted to respective data channel transmitters 411B . . . 411N. Furthermore, each data channel may handle a speed greater than 100 Gbps.

Modulator 403 generates a modulated optical signal on a wavelength $\lambda 1$ in channel transmitter 411A, and the modulated optical signal is transmitted on a single-mode waveguide 412A. Similarly, modulators 404, 405 . . . 406 each generate a respective modulated optical signal on a different wavelength, $\lambda 2, \lambda 3 \ldots \lambda N$, respectively in the channel transmitter 411A, and each of the respective modulated optical signals is transmitted on a respective single-mode fiber 412B, 412C . . . 412N.

The modulated optical signals carried on respective single-mode waveguides 412A, 412B, 412C . . . 412N are combined by a multiplexer 415 to generate a combined optical signal carried on single-mode fiber 416. The multiplexer 415 may also combine the modulated optical signal with an optical signal 413 received from another node. In this case, the wavelengths used at Node A must be different from those of the incoming optical signal 413. The multiplexer 415 may be a reconfigurable optical add-drop multiplexer (ROADM) and may include a wavelength multiplexer. The multiplexer 415 combines the multiple modulated optical signals carried on respective single-mode waveguides 412A, 412B, 412C . . . 412N (transmitted from channel transmitter 411A); 414A . . . 414N (transmitted from channel transmitter 411B); and 431A . . . 431N (transmitted from channel transmitter 411N) into one combined optical signal that is transmitted out of Node A 470 carried on a single-mode fiber 416. Note that each of the fibers 412A-412N, 414A-414N, and 431A-431N must carry a distinct wavelength that is different from the wavelengths used in the other fibers 412A-412N, 414A-414N, and 431A-431N. All of the modulated signals generated by a respective channel transmitter form a respective channel of the combined optical signal. Accordingly, channels are defined in an optical signal transmitted on the single-mode fiber 416 by dedicating a number of different wavelengths for transmitting related sub-signals.

The combined optical signal carried on the single-mode fiber 416 may then be transmitted to an intermediary node, such as Node B 480. The node may include a multiplexer 417 (such as a ROADM). Multiplexer 417 may drop one or more wavelength channels λK at Node B. Multiplexer 417 may also add additional signals to the combined optical signal. The additional signals may include signals at wavelengths that are no longer part of the combined signal, such as dropped wavelengths (e.g. λK) or wavelengths that were not included in the combined signal carried by optical fiber 416. Multiplexer 417 may forward the combined optical signal to a destination node, Node Z 490, carried on another single-mode fiber 418.

In FIG. 4B at Node Z 490, the combined optical signal, carried on the single-mode fiber 418, is received at multiplexer 419, which may include a wavelength demultiplexer. If Node Z 490 is the destination node for a data signal, the corresponding set of wavelengths is separated from the combined optical signal and routed to receiver 420, as indicated by the four downward pointing arrows. The receiver 420 then converts the optical signals on this set of wavelengths back into a data signal 432. If desired, new data channels may be added to the combined signal exiting Node B or Node C by modulating them onto sets of wavelengths which are not otherwise in use in the output signals from these nodes. Since the wavelengths must be added and dropped in sets instead of individually, the wavelength reuse process may be less efficient than it was for the lower-speed networks discussed in FIG. 3.

The combined optical signal or a subset of wavelengths that form the combined optical signal may be further transmitted to other nodes 423 using single-mode fiber and may be received by other nodes 423 in a similar manner as the receiver 420 of Node Z 490.

Each strand of single-mode fiber used to transmit the combined optical signal may carry 10 to 12 data channels that are at a data rate of 1 Tbps. The 1 Tbps signal will require multiple modulators, each for a different optical carrier. Therefore, it is possible to carry a channel in a single strand of single-mode fiber by using multiple light sources, for example, 8 different wavelengths of optical carrier waves, one emitted by each of 8 light sources, per channel.

Figure 4C:
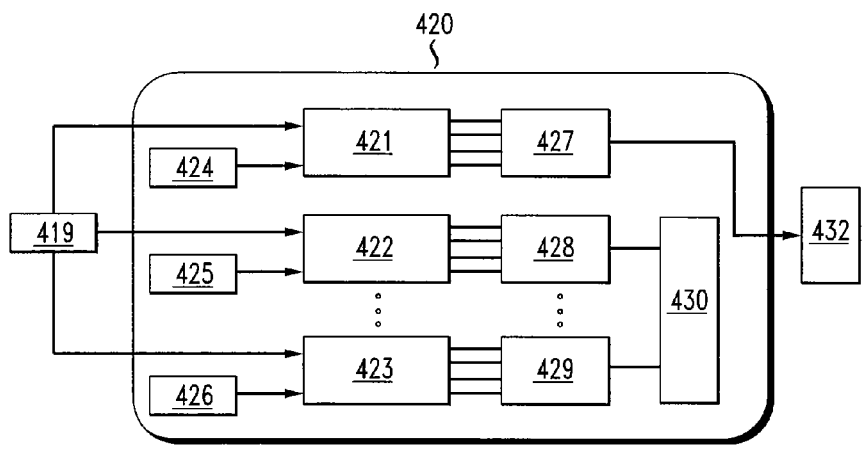
FIG. 4C illustratively depicts the details of a receiver shown in FIG. 4B.

FIG. 4C depicts details of receiver 420 of FIG. 4B. The receiver 420 may be a coherent receiver, for example, to be used for one channel using "N" carriers without SDM. The receiver 420 includes multiple receiver front ends 421, 422 . . . 423. Details of a receiver front end, such as receiver front ends 421, 422 . . . 423, are described above with respect to FIG. 3B.

Each receiver front end 421, 422 . . . 423, combines the optical signal received from multiplexer/demultiplexer 419 with optical carrier waves emitted from local oscillators 424, 425 . . . 426, respectively. Each local oscillator emits optical carrier waves at a different wavelength than the other.

Each receiver front end, such as receiver front end 421, produces an in-phase component for X polarization, a quadrature component for X polarization, an in-phase component for Y polarization and a quadrature component for Y polarization, transmitted to a digital signal processor, such as a first digital signal processor 427. Similarly, receiver front ends 422 . . . 423, produce in-phase component for Y polarization, quadrature component for Y polarization, in-phase component for Y polarization and quadrature component for Y polarization, transmitted to a second digital signal processors 428 and an "N" digital signal processor 429, respectively. The first digital signal processor 427 sorts the component signals, which include a channel whose signals are mixed together and distorted, and performs various filtering techniques to the component signals. Digital signal processors 427, 428 . . . 429, after applying various processing techniques, each produce a data signal 432 corresponding to a respective data sub-signal output by parallel converter 402. Alternatively, a parallel to serial converter 430 may combine two or more sub-signals to produce a data signal that is close to or equivalent to the originally transmitted data signal 401A.

Multi-spatial mode media may be multimode fibers or multicore fibers. Alternatively, multi-spatial mode media may be non-fiber waveguiding structures such as planar waveguide; or multi-spatial mode media may be non-waveguiding media such as free-beam propagation media; or one or more single-mode fibers that are bound together so that they experience correlated environmental variations. Further, multi-spatial mode media may include a combination of the above, for example, it could be multiple multicore fibers bound together in a optical cable, wherein each core of the multi-core fiber supports multiple spatial modes, or it may be multicore fiber where each core is multimode.

Multimode fibers (MMF) have a much larger core diameter than single-mode fibers, typically 50 or 62.5 microns, so they can support many transverse modes. Few-mode fibers, with core diameters intermediate between single-mode fiber and typical MMF have also been demonstrated. Each transverse mode has a characteristic pattern of light distribution across the core, and generally each mode has its own modal index, defined as the velocity of light in vacuum divided by the velocity of light propagating in the specific mode. Digital signal processing required for reception of signals from MMF may typically require a number of mathematical operations proportional to $N^2$, where "N" is the number of modes.

Multicore fibers (MCF) contain a limited number of cores (for example, 7 cores or 20 cores). The cores cannot be placed arbitrarily close together without introducing some signal interference between the cores; and the outer diameter of the cladding cannot become too large due to limitations of the material (i.e. the glass may break when bent, if the outer diameter(s) of core(s) and/or cladding become(s) too large). In some systems, 7 cores may support up to 100 wavelengths for a total transmission capacity 7 times greater than that of a single-mode fiber. The seven cores may be arranged in a hexagonal pattern within the cladding of the fiber.

Figure 5A:
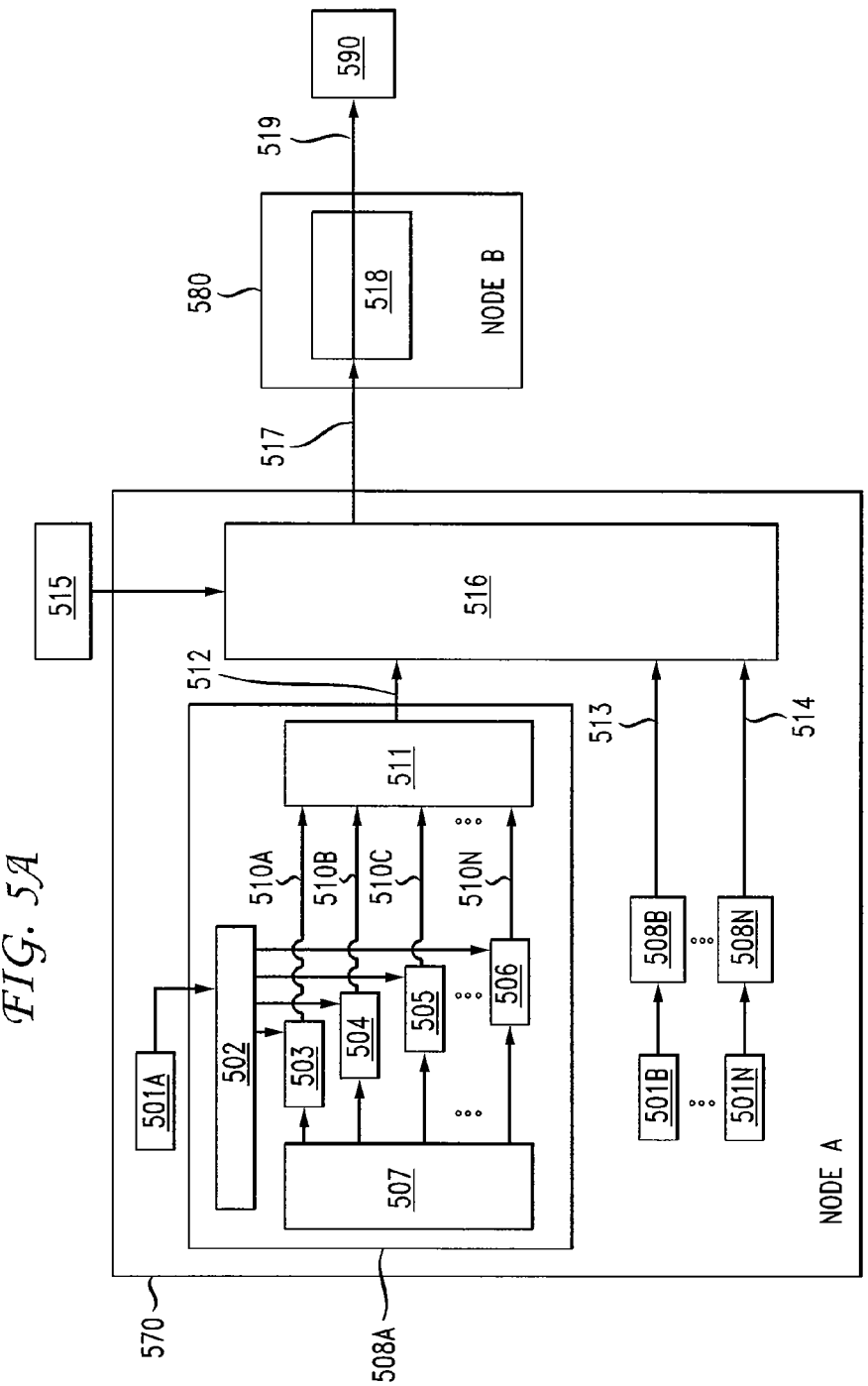
FIG. 5A illustratively depicts a transmitter within a node and an intermediate node using multi-spatial mode media for transmission in an optical fiber network system using SDM.
Figure 5B:
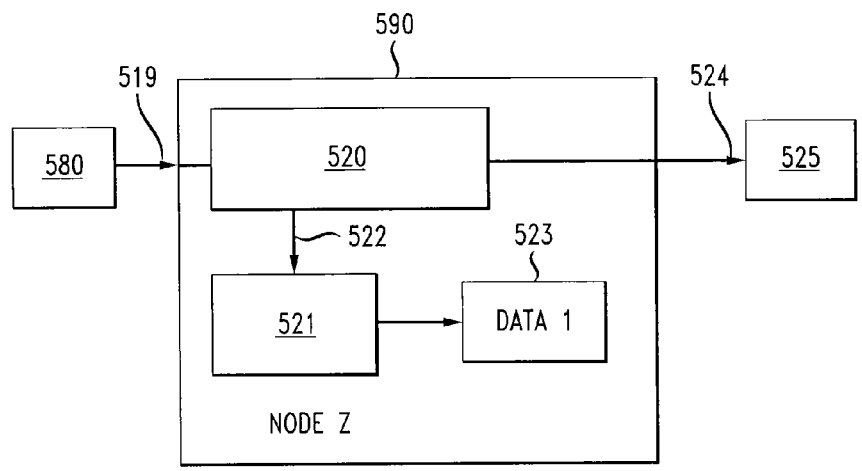
FIG. 5B illustratively depicts a receiver within a node in the optical fiber network system.
Figure 5C:
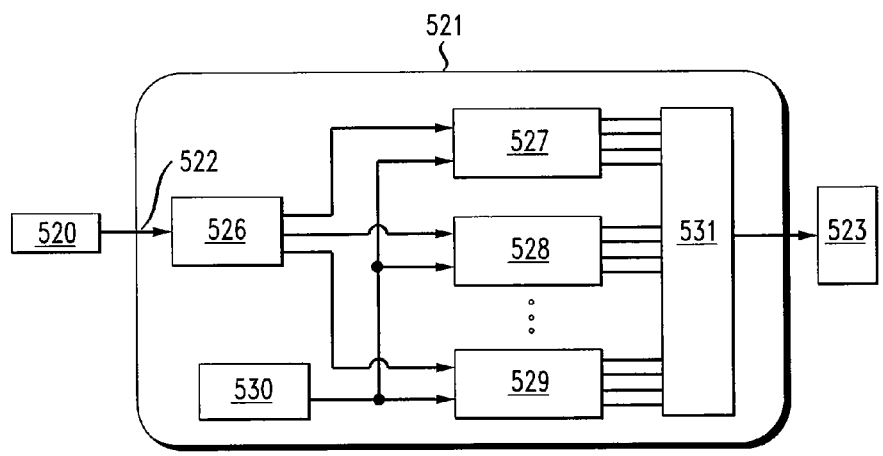
FIG. 5C illustratively depicts the details of the receiver using SDM shown in FIG. 5B.

The greatest capacity increases may be achieved when multiple cores are used with each core supporting multiple spatial modes. This complex solution should become more attractive as technology progresses FIGS. 5A, 5B and 5C illustratively depict an apparatus for receiving and transmitting optical signals using multi-spatial mode media according to an embodiment of the present disclosure. In the embodiment of FIGS. 5A, 5B and 5C, the apparatus may be capable of handling high data speeds, such as 1 Tbps or greater. The apparatus uses space division multiplexing (SDM). The transmitter and receiver shown in FIGS. 5A, 5B and 5C are for exemplary purposes and each of Nodes A, B and Z (570, 580 and 590, respectively) may contain one or more transmitters and receivers.

FIG. 5A depicts optical network communication between Nodes A, B and Z (570, 580 and 590, respectively) using multi-spatial mode media. Data signal 501A, 501B . . . 501N may be electrical signals representing streaming data. Data signal 501A may be received at a channel transmitter 508A. A single node, such as Node A 570, may include a plurality of channel transmitters 508A, 508B . . . 508N. As illustrated by channel transmitter 508A, each channel transmitter may include a serial to parallel converter 502, a plurality of modulators 503, 504, 505 . . . 506 and a light source 507 that is shared by the modulators 503, 504, 505 . . . 506.

Data signal 501A is transmitted to a serial to parallel converter 502 in Node A 570. The serial to parallel converter 502 converts the data signal 501A into multiple data sub-signals. Each data sub-signal is transmitted to a respective modulator 503, 504, 505 . . . 506. Each modulator 503, 504, 505 . . . 506 may be coupled to a light source 507. The light source 507 may be a laser, such as a semiconductor laser. Each modulator 503, 504, 505 . . . 506 combines the data sub-signal onto an optical carrier wave emitted from the light source 507. Node A 570 may include multiple data channel transmitters 508A, 508B . . . 508N. Data signals 501B . . . 501N are transmitted to respective data channel transmitters 508B . . . 508N, each of which operates similarly to channel transmitter 508A. Each modulator within a data channel transmitter may share its light source with the other modulators within the data channel transmitter. Therefore, each data sub-signal is the modulation of an optical carrier (or wave) at the same nominal wavelength (or optical frequency). In one embodiment, each sub-signal may use a copy of the same light source (at the nominal wavelength) and all the sub-signals in a channel transmitter may be phase-coherent with each other, at least right after transmission. In another embodiment, each sub-signal may use an independent light source (at or near the nominal wavelength). In this embodiment, each sub-signal's wavelength may differ slightly from the others. In any of these (or other) embodiments, each sub-signal shares a common wavelength with another sub-signal in the same data channel transmitter.

Each data channel transmitter may have a separate respective light source and therefore, signals generated by each channel transmitter may have a different wavelength than those generated by another channel transmitter. In this way, signals generated by channel transmitters 508A, 508B . . . 508N have different wavelengths. Accordingly, in the embodiment of FIG. 5A, each data channel corresponds to a respective wavelength. Furthermore, each data channel may handle a speed of up to 1 Tbps or more.

In one embodiment, integrated optical waveguides may be used as described in the following. The light source 507 emits an optical carrier which is transmitted to the modulators 503, 504, 505 . . . 506, and the output of the modulators 503, 504, 505 . . . 506 is transmitted via a respective optical waveguides 510A, 510B, 510C . . . 510N. Waveguide 510A may be a waveguide on an integrated device that contains a plurality of waveguides. Modulators 503, 504, 505 . . . 506 and multiplexer 511 or waveguide 510A may be a single mode optical fiber coupled to both the modulator 503 and the spatial multiplexer 511.

In one embodiment, the light source 507 may be integrated with one or more modulators 503, 504, 505 . . . 506. A modulator, such as modulator 503, combines data sub-signal onto an optical carrier wave (e.g., a light signal) emitted from light source 507, and generates a modulated optical sub-signal to transmit to a multiplexer 511. Similarly, modulators 504, 505 . . . 506 combine respective data sub-signals onto an optical carrier wave emitted from light source 507 and generate respective modulated optical sub-signals, each having the same wavelength, to transmit to a multiplexer 511.

The multiplexer 511 may be a spatial multiplexer. The multiplexer 511 combines all the sub-signals output from modulators 503, 504, 505 . . . 506 in channel transmitter 508A into a signal that is launched onto multi-spatial mode media 512. Channel transmitters 508B . . . 508N may contain respective multiplexers similar to multiplexer 511 of channel transmitter 508A. In one embodiment, the spatial multiplexer 511 may be integrated with one or more modulators 503, 504, 505 . . . 506. In another embodiment, although the apparatus in FIG. 5A depicts the multiplexer 511, the multiplexer 511 may be an optional component. An example embodiment without a multiplexer 511 (not shown), may be one in which each output signal generated by modulators 503, 504, 505 . . . 506 in channel transmitter 508A may be directly placed onto respective modes of multi-spatial mode media. In yet another embodiment, the functions of the spatial multiplexer 511 may be integrated into the wavelength multiplexer 516, which may be a ROADM.

The modulated optical sub-signals are launched onto multi-spatial mode media. For example, the modulated optical sub-signal from channel transmitter 508A is launched on to multi-spatial mode media 512; the modulated optical sub-signal from channel transmitter 508B is launched on to multi-spatial mode media 513; and similarly for all channel transmitters up to 508N, which is launched on to multi-spatial mode media 514. Signals carried on multi-spatial mode media 512, 513, . . . 514 are combined by a multiplexer 516 to generate a combined optical signal on multi-spatial mode medium 517. The multiplexer 516 may be a multi-spatial mode ROADM and may include a multi-spatial mode wavelength multiplexer. Thus, the multiplexer 516 combines all the modulated optical signals on multi-spatial mode media 512, 513 . . . 514 from channel transmitters 508A; channel transmitter 508B up to channel transmitter 508N, respectively, into one combined optical signal that is transmitted out of Node A 570 and launched onto a new multi-spatial mode medium 517.

As described above, channel transmitter 508B may receive a second data signal 501B. Similar to channel transmitter 508A, channel transmitter 508B may convert the second data signal into multiple data sub-signals which are then converted to second optical sub-signals having a second common wavelength. A multiplexer in channel transmitter 508B may transmit each of the second optical sub-signals at the second common wavelength on a spatial mode of a second multi-spatial mode media 513. Multiplexer 516 may multiplex one of the optical sub-signals from channel transmitter 508A and one of the second optical sub-signals from channel transmitter 508B onto each of the spatial modes of the multi-spatial mode medium 517 such that the optical sub-signals from channel transmitter 508A are transmitted over the spatial modes at their common wavelength and the second optical sub-signals are transmitted over the spatial modes at the second common wavelength. Similarly, multiplexer 516 multiplexes optical sub-signals transmitted from all channel transmitters (e.g., 508A, 508B . . . 508N) onto the spatial modes of multi-spatial mode medium 517.

The multiplexer 516 may also combine other modulated optical sub-signals 515 received from another node with other sub-signals for transmission onto multi-spatial mode medium 517. In such an embodiment, the wavelengths used at Node A 570 must be different from those included in the incoming optical signal 515. The multiplexer 516 may be a reconfigurable optical add-drop multiplexer (ROADM) and may include a wavelength multiplexer. The multiplexer 516 combines the modulated optical sub-signals such that each mode of the multi-spatial mode media carries multiplexed optical sub-signals from different channel transmitters having different wavelengths. All of the modulated sub-signals generated by a particular channel transmitter form a respective channel of the combined optical signal carried on multi-spatial mode media 517. Accordingly, one channel of the multi-spatial mode media may correspond to a particular wavelength, and different sub-signals generated from the same data signal are transmitted on different spatial modes of the multi-spatial mode media 517 at the same wavelength.

In one embodiment, the optical sub-signals may be phase-locked to one another.

Each of the optical sub-signals generated by a channel transmitter shares a common wavelength, for example, the wavelength of optical carrier waves emitted by light source 507.

In one embodiment, a portion of the multi-spatial mode media may include multiple fiber core regions. In this case, each core region may be a spatial mode on which optical signals are transmitted. Alternatively, the most desirable spatial modes may be made up of particular phase and amplitude combinations of waves in the multiple cores.

In one embodiment, a portion of the multi-spatial mode media may include a single core region portioned to sustain propagation of multiple distinct traverse spatial modes.

The multi-spatial mode media may include multiple cladding regions and multiple core regions bound together to assure common propagation characteristics for multiple optical channels.

In one embodiment represented by FIG. 5A, the modulators 503, 504 . . . 506 may implement OFDM modulation, in which each optical sub-signal is organized into a superchannel made up of discrete frequency bands. Such OFDM-formatted optical sub-signals have a single wavelength, defined by the wavelength of the light source's optical carrier entering the modulator.

In another embodiment, ganged data signals may comprise multiple data signals all originating at Node A, and sharing a common destination Node B, each of which is fed to a modulator (503, 504 . . . 506). In this case, serial to parallel converter 502 is not needed.

The combined optical signal carried on the multi-spatial mode media 517 may then be transmitted to an intermediary node, such as Node B 580. The node may include a multiplexer 518 (such as a multi-spatial mode ROADM). Multiplexer 518 may drop a wavelength channel λK at Node B 580. Multiplexer 518 may also add additional signals to the combined optical signal. The additional signals may include signals at wavelengths that are no longer part of the combined signal, such as dropped wavelengths (e.g. λK) or wavelengths that were not included in the combined signal carried by multi-spatial mode media 517. Multiplexer 518 may forward the combined optical signal to a destination node, Node Z 590, carried on another multi-spatial mode media 519. The multi-spatial mode media 519 carries the optical signal to a destination node, such as Node Z 590 as depicted in FIG. 5B.

In FIG. 5B at Node Z 590, the optical signal, transmitted on multi-spatial mode media 519, is received at multiplexer 520, which may be a ROADM. If Node Z 590 is the destination node for one or more data signals, the wavelength(s) corresponding to those channel(s) are separated from the combined optical signal and routed for reception. Although only one receiver 521 is shown for exemplary purposes, additional receivers and transmitters may be included in Node Z 590. Furthermore, if some signal interference is introduced in the signal, it may be corrected by the receiver.

In one embodiment shown in FIG. 5C, multiplexer 520 further separates the routed signal by wavelength, and each wavelength traverses a multi-spatial mode medium 522 to a receiver 521. Alternatively, multiplexer 520 may route multiple wavelengths via multi-spatial medium 522, and the wavelength channel destined for receiver 521 is filtered from other wavelength channels within receiver 521. This may be done through an optical filter, or a combination of appropriately setting the wavelength of a local oscillator within receiver 521 and electrical filtering. The receiver 521 converts each optical signal back into a data signal 523. If desired, new data channels may be added to the combined signal exiting Node B or Node Z by modulating them onto wavelengths which are not otherwise in use in the output signals from these nodes. Since SDM allows the wavelengths to be added and dropped individually instead of in sets, the wavelength reuse process is as efficient as it was for the lower-speed networks discussed in FIG. 3.

The optical signal may be further transmitted to other nodes 525 using multimode media 524 and may be received by other nodes 525 in a similar manner as the receiver 521 of Node Z 590. Although the example described here is a simple linear chain of three nodes, actual optical networks may include many nodes and many fiber links, arranged in ring or mesh topologies.

In one embodiment, with multi-spatial mode media capable of SDM transmission over 8 modes, this system may carry 80 to 100 channels at 1 Tbps each.

FIG. 5C depicts details of receiver 521 of FIG. 5B. The multi-spatial mode optical signal is received by a spatial demultiplexer 526. The spatial demultiplexer 526 separates the multi-spatial mode optical signal into "N" branch signals. The branch signals correspond to signals of a common wavelength received on different spatial modes of the multi-spatial mode medium. The receiver 521 includes multiple receiver front ends 527, 528 . . . 529. The branch signals are transmitted from the spatial demultiplexer 526 to respective receiver front ends, 527, 528 . . . 529.

Each receiver front end 527, 528 . . . 529 receives branch signals from the spatial demultiplexer 526. These branch signals, transmitted from the multiplexer 526, have a respective common wavelength. Each receiver front end 527, 528 . . . 529 mixes each branch signal with optical carrier waves emitted from a single local oscillator 530 (e.g. a light signal) having the common wavelength. Therefore, all the receiver front ends 527, 528 . . . 529 may receive signals at the same wavelength. In this embodiment, only one local oscillator 530 may be required at the receiver 521. Such an embodiment may reduce the cost and size of a receiver in a node. If the multi-spatial mode media has low crosstalk between the spatial modes (e.g. multicore fiber with low cross talk) then each branch signal will correspond to an optical sub-signal of the common data signal. Transmission impairments may need to be corrected for in order to recover the data. If the multi-spatial media does not have low crosstalk, then each branch signal will be a mixture of optical sub-signals, and this mixing is reversed in order to recover the original data signal.

Each receiver front end, such as receiver front end 527, produces an in-phase component for X polarization, a quadrature component for X polarization, an in-phase component for Y polarization and a quadrature component for Y polarization, transmitted to a joint digital signal processor, such as joint digital signal processor 531. Similarly, receiver front ends 528 . . . 529, produce in-phase component for X polarization, quadrature component for X polarization, in-phase component for Y polarization and quadrature component for Y polarization, transmitted to the same joint digital signal processor 531. The component signals may be referred to as data sub-signals. Joint digital signal processor 531 sorts the component signals or the data sub-signals, which have been mixed together and distorted by transmission through the network. Joint digital signal processor 531 deconvolves the data sub-signals and performs various filtering and processing techniques in order to recover a data signal 523 that is close to or equivalent to the originally transmitted data signal 501A. Therefore, the data sub-signals are combined in order to recover the originally transmitted data signal 501A.

Because the optical sub-signals were generated at the transmitter from a single light source, transmitted through the network in the same multi-spatial mode media, and detected in a receiver with a common light source and/or local oscillator, the receiver branch signals share a common phase reference and many of the same impairments. For example, each optical sub-signal may experience the same laser amplitude noise, phase noise, path length, temperature variation, and chromatic dispersion. These commonalities may be used to simplify the digital signal processing leading to significant improvements in receiver cost and power dissipation. These commonalities may also ease the required specifications on the light source 507, so that light source 507 may have a broader linewidth than what would be required for light source 407. Therefore, light source 507 might be a laser or a different light source, such as a light-emitting diode (LED).

One of the signals may be used as a reference that represents the other signals. Signal processing, including filtering, may be performed on the reference to detect and sort out impairments including noise, delay distortion, attenuation and cross-talk, and thus, improving reception of the other signals. In order to filter the signal, some algorithms may be applied to the optically impaired reference in order to recover a signal as close to the original data signal with no or minimum errors. As the reference signal may be used in signal processing of the other signals, performing digital signal processing on only the one reference may simplify the digital signal processing (which may be less than "N" times as complicated as other systems). As such, only one phase recovery process may be performed and applied to all the signals sharing some common factors instead of "N" phase recovery processes. In other words, each of the other data sub-signals are processed based on the optical impairment detected in the reference. Such a system may be more cost effective over other systems.

In one embodiment, the joint digital signal processor may provide improvement in performance. By deriving impairment values from multiple signals, (e.g., using multiple independent estimates of phase-lock error and frequency error) the performance may be improved over other systems, as more accurate values are obtained.

FIG. 6 depicts a method of transmitting optical signals using multi-spatial mode media according to an embodiment of the present disclosure. The method may be performed by a transmitter node, such as transmitter 508 in FIG. 5A. At 601, a data signal is received. The data signal may be data signal 501A in FIG. 5A.

At 602, a light source emits an optical carrier wave having a common wavelength. The light source may be light source 507 in FIG. 5A.

At 603, the data signal is converted into a plurality of optical sub-signals having a common wavelength. Modulators 503, 504, 505 . . . 506 in FIG. 5A may perform this conversion. Further, a serial to parallel converter 502 in FIG. 5A may also be used to separate the data signal into multiple sub-signals. The modulators may then modulate each of the sub-signals onto optical carrier waves emitted by a light source, so that the modulated optical sub-signals have the common wavelength. The laser 507 in FIG. 5A may be the source of the optical carrier waves.

At 604, each of the plurality of optical sub-signals is transmitted at the common wavelength on a respective spatial mode of a multi-spatial mode media. The multi-spatial mode media 512, 513 and 514 in FIG. 5A may be used for the transmission.

In a multi-spatial mode media, a first optical sub-signal may propagate through a different spatial mode than a second optical sub-signal at the same wavelength.

Figure 7:
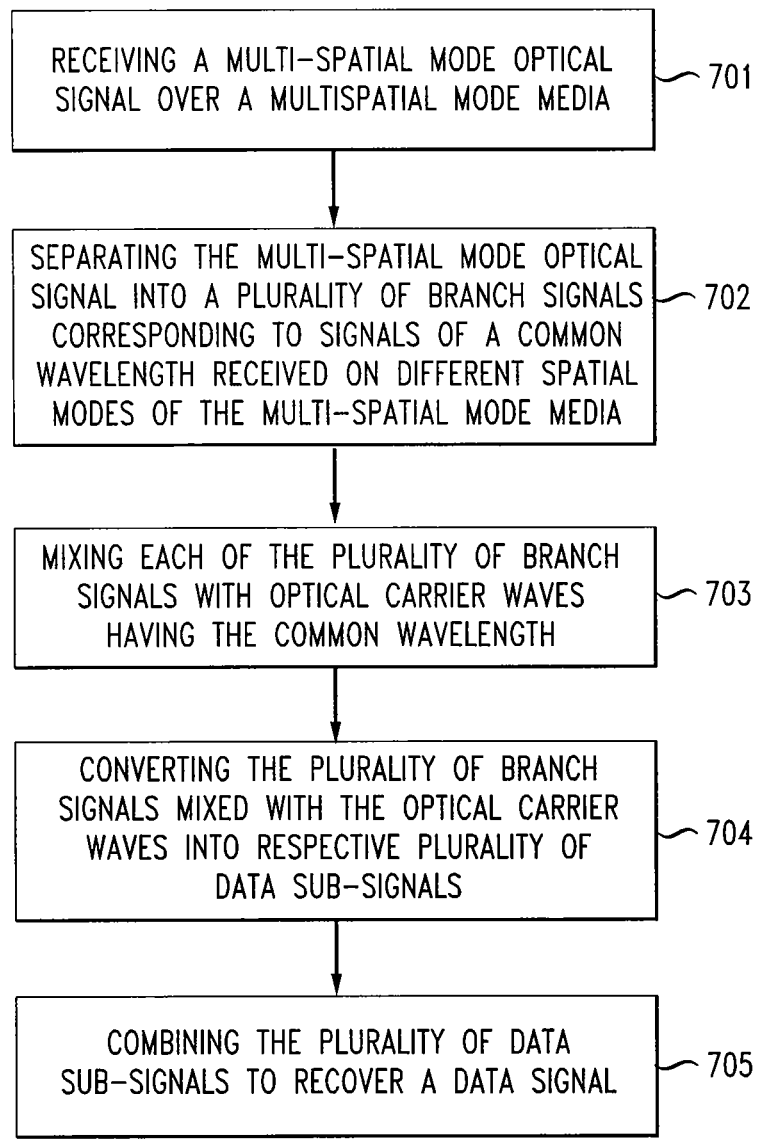
FIG. 7 is a flowchart of a method for receiving data in the fiber optic system in accordance with an embodiment of the present disclosure.

FIG. 7 depicts a method for receiving an optical signal transmitted using a multi-spatial mode media according to an embodiment of the present disclosure. The method may be performed by a receiver, such as receiver 521 in FIGS. 5B and 5C. At 701, the receiver receives a multi-spatial mode optical signal over a multi-spatial mode media. A first optical sub-signal of the multi-spatial mode optical signal may be in a different spatial mode than a second optical sub-signal of the multi-spatial mode optical signal and the two optical sub-signals may be received by the receiver in different spatial modes of the multi-spatial mode media. In one embodiment in multimode fiber, the sub-signals propagation paths may move from one mode to another in the fiber, resulting in mixing of the data sub-signals.

At 702, the multi-spatial mode optical signal is separated into a plurality of branch signals corresponding to signals of a common wavelength received on different spatial modes of the multi-spatial mode media. For example, a spatial demultiplexer, such as spatial demultiplexer 526, may be used to separate the multi-spatial mode optical signal into branch signals, as depicted in FIG. 5C.

At 703, each of the plurality of branch signals are mixed, for example, using one of the receiver front ends 527, 528 . . . 529 depicted in FIG. 5C, with optical carrier waves having the common wavelength emitted from a local oscillator, such as local oscillator 530 depicted in FIG. 5C.

At 704, the respective, plurality of branch signals mixed with the optical carrier waves are converted into respective plurality of data sub-signals. For example, the receiver front ends 527, 528 . . . 529 depicted in FIG. 5C may perform this conversion. The branch signals may be a mixture of data sub-signals, so that multiple branch signals may need to be processed in order to retrieve the original data sub-signals.

At 705, plurality of data sub-signals are combined to recover a data signal, for example, using the joint digital signal processor 531 depicted in FIG. 5C.

Figure 8:
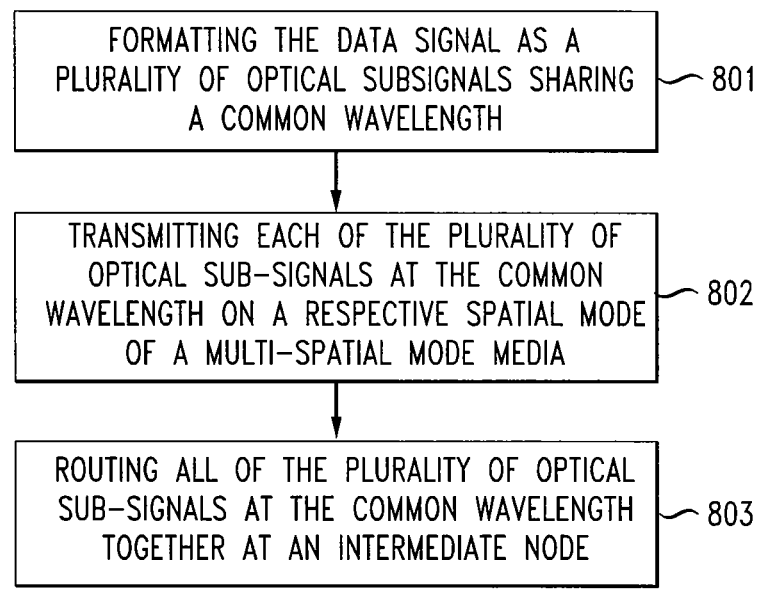
FIG. 8 is a flowchart of a method for routing a plurality of optical sub-signals in accordance with an embodiment of the present disclosure.

FIG. 8 depicts a method for routing a plurality of optical sub-signals in accordance with an embodiment of the present disclosure. The method may be performed by various components in any of the nodes (e.g. Nodes A, B, etc.) shown in FIG. 5A. At 801, the data signal is formatted as a plurality of optical sub-signals sharing a common wavelength. Modulators 503, 504, 505 . . . 506 in FIG. 5A may perform this conversion. Further, a serial to parallel converter 502 in FIG. 5A may also be used to separate the data signal into multiple sub-signals. The modulators may then modulate each of the sub-signals onto optical carrier waves emitted by a light source, so that the modulated optical sub-signals have the common wavelength. The laser 507 in FIG. 5A may be the source of the optical carrier waves.

At 802, each of the plurality of optical sub-signals is transmitted at the common wavelength on a respective spatial mode of a multi-spatial mode media. The multi-spatial mode media 512, 513 and 514 in FIG. 5A may be used for the transmission.

In a multi-spatial mode media, a first optical sub-signal may propagate through a different spatial mode than a second optical sub-signal at the same wavelength.

At 803, the plurality of optical sub-signals are routed at the common wavelength together at an intermediate node. For example, the optical sub-signals may be routed at the common wavelength together at Node B in FIG. 5A. In one embodiment, at least two of the plurality of optical sub-signals are phase-locked to one another.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments depicted and described herein are only illustrative of the principles of the present disclosure and that various modifications may be implemented by those skilled in the art without departing from the scope and spirit of the invention. Those skilled in the art could implement various other feature combinations without departing from the scope and spirit of the invention.

The invention claimed is:

1. A method of recovering a data signal from a space division multiplexed multi-spatial mode optical signal comprising:
    separating the space division multiplexed multi-spatial mode optical signal into a plurality of branch signals having a common wavelength, the plurality of branch signals corresponding to signals having the common wavelength, the signals having the common wavelength being received on different spatial modes of the multi-spatial mode media, the space division multiplexed multi-spatial mode optical signal being received over a multi-spatial mode media;
    mixing the plurality of branch signals with a plurality of optical carrier waves having the common wavelength;
    converting the plurality of branch signals mixed with the plurality of optical carrier waves into a plurality of data sub-signals having the common wavelength, the plurality of data sub-signals comprising in-phase Y polarization components, quadrature Y polarization components, in-phase X polarization components, and quadrature X polarization components; and
    recovering the data signal by combining the plurality of data sub-signals.

2. The method of claim 1, wherein two of the plurality of optical carrier waves having a common wavelength are phase-locked together.

3. The method of claim 1, further comprising:
    deriving frequency and phase information from a first data sub-signal of the plurality of data sub-signals; and
    recovering a second data sub-signal of the plurality of data sub-signals using the frequency and phase information.

4. The method of claim 1, further comprising:
    detecting an optical impairment in a first data sub-signal of the plurality of data sub-signals using the first data sub-signal; and
    processing a second data sub-signal of the plurality of data sub-signals based on the optical impairment.

5. The method of claim 1, wherein the plurality of branch signals comprise path length in common.

6. The method of claim 1, wherein the plurality of branch signals comprise temperature variation in common.

7. The method of claim 1, wherein the plurality of branch signals comprise amplitude noise in common.

8. The method of claim 1, wherein the plurality of branch signals comprise phase noise in common.

9. The method of claim 1, wherein the plurality of branch signals comprise polarization mode dispersion in common.

10. The method of claim 1, wherein the plurality of branch signals comprise chromatic dispersion in common.

* * * * *